(12) United States Patent
Kim

(10) Patent No.: US 9,327,575 B2
(45) Date of Patent: May 3, 2016

(54) AIR SPRING FOR VEHICLE

(71) Applicant: Hyundai Motor Company, Seoul (KR)

(72) Inventor: Byung Bae Kim, Jeoju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/452,273

(22) Filed: Aug. 5, 2014

(65) Prior Publication Data

US 2015/0165859 A1    Jun. 18, 2015

(30) Foreign Application Priority Data

Dec. 18, 2013  (KR) .................. 10-2013-0157913

(51) Int. Cl.
| | | |
|---|---|---|
| B60G 17/052 | (2006.01) | |
| B60G 11/27 | (2006.01) | |
| F16F 9/04 | (2006.01) | |

(52) U.S. Cl.
CPC ............ B60G 17/0525 (2013.01); B60G 11/27 (2013.01); B60G 17/0521 (2013.01); F16F 9/049 (2013.01); B60G 2202/152 (2013.01); B60G 2206/42 (2013.01)

(58) Field of Classification Search
CPC ............. B60G 17/0155; B60G 17/044; B60G 17/0525; B60G 11/27; B60G 15/12
See application file for complete search history.

(56) References Cited

U.S. PATENT DOCUMENTS

| | | | |
|---|---|---|---|
| 4,877,223 A * | 10/1989 | Hackett ................ | B60G 17/044 267/64.17 |
| 5,058,916 A | 10/1991 | Hicks | |
| 5,996,980 A * | 12/1999 | Frey et al. .................. | 267/64.27 |
| 6,332,602 B1 * | 12/2001 | Oishi .................... | F16F 13/002 267/118 |
| 6,511,057 B1 * | 1/2003 | Berg .......................... | 267/64.27 |
| 7,487,957 B2 * | 2/2009 | Brunneke et al. .......... | 267/64.24 |
| 8,511,652 B2 * | 8/2013 | Moulik et al. ............. | 267/64.21 |
| 8,800,975 B2 * | 8/2014 | Moulik et al. ............. | 267/64.24 |
| 2004/0130079 A1 * | 7/2004 | Gold et al. .................. | 267/64.23 |
| 2004/0245687 A1 * | 12/2004 | Sendrea et al. ............ | 267/64.16 |
| 2005/0098931 A1 * | 5/2005 | Schisler ................... | B60G 7/04 267/64.27 |
| 2006/0225979 A1 | 10/2006 | Quinn et al. | |
| 2007/0023981 A1 * | 2/2007 | Helmling ............... | B60G 15/14 267/64.15 |
| 2011/0115139 A1 * | 5/2011 | Moulik .................. | B60G 15/14 267/64.23 |
| 2011/0115140 A1 * | 5/2011 | Moulik et al. ............. | 267/64.23 |
| 2011/0140324 A1 * | 6/2011 | Naber ....................... | 267/140.13 |
| 2013/0207355 A1 | 8/2013 | Pavuk et al. | |

(Continued)

FOREIGN PATENT DOCUMENTS

| | | |
|---|---|---|
| KR | 2000-0073320 A | 12/2000 |
| KR | 10-2013-0012527 A | 2/2013 |

*Primary Examiner* — Barry Gooden, Jr.
(74) *Attorney, Agent, or Firm* — Morgan, Lewis & Bockius LLP

(57) ABSTRACT

An air spring for a vehicle may include a piston chamber with a bottom connected with an axle assembly to be able to move up/down, an air chamber with a top fixed to a car body and a bottom seated over a top of the piston chamber to be extendable and contractible by inflow/outflow of air, a piston positioned in the piston chamber, vertically dividing an internal space of the piston chamber into upper and lower internal spaces, and airtightly separating the upper internal space from the lower internal space, and an air control mechanism allowing air to flow into/out of the upper and lower internal spaces of the piston chamber and the internal space of the air chamber so that the piston chamber and the axle assembly are moved up/down with extension/contraction of the air chamber by the inflow/outflow of the air.

6 Claims, 4 Drawing Sheets

(56) References Cited

U.S. PATENT DOCUMENTS

| | | | |
|---|---|---|---|
| 2013/0221625 A1* | 8/2013 | Pare | B60G 11/27 280/5.514 |
| 2013/0234377 A1* | 9/2013 | Leonard | 267/219 |
| 2013/0300074 A1* | 11/2013 | Koeske | B60G 11/27 280/6.157 |
| 2014/0049013 A1* | 2/2014 | Dehmel | B60G 11/27 280/6.157 |
| 2014/0225345 A1* | 8/2014 | May | B60G 17/0155 280/124.157 |
| 2015/0008627 A1* | 1/2015 | Leonard | F16F 7/09 267/64.24 |
| 2015/0217617 A1* | 8/2015 | Leonard | B60G 11/62 280/124.16 |

* cited by examiner

AIR SPRING FOR VEHICLE

CROSS-REFERENCE TO RELATED APPLICATION

The present application claims priority of Korean Patent Application Number 10-2013-0157913 filed on Dec. 18, 2013, the entire contents of which application are incorporated herein for all purposes by this reference.

BACKGROUND OF INVENTION

1. Field of Invention

The present invention relates to an air spring for a vehicle, and more particularly, to an air spring for a vehicle which simultaneously performs the functions of shock-absorbing and vertical movement of a pusher system.

2. Description of Related Art

Freight cars such as trucks may be additionally equipped with pusher and tag systems on the rear wheel shaft to increase the load of freight.

FIG. 1 is a view showing the structure of a pusher system according to the related art. Referring to FIG. 1, the pusher system includes ride air springs 3 between the car body 2 and the axle 1 to absorb shock and clamp beams 4 that are held by the ride air springs 3 and support the axle 1 with wheels at both ends. Lift air springs 5 for lifting or descending the axle 1 are disposed at the front ends of the clamp beam assemblies 4.

Weight distribution on the front and rear shafts is possible by the air pressure from air springs for traveling, while air springs for lifting not only prevent friction of tires, but also improve riding comfort and fuel efficiency because vehicles without a load travel with the axle lifted, and when the vehicles are loaded, the pusher axle and the tag axle are descended for use.

The pusher system of the related art, however, has a problem in that since the ride air springs for shock-absorbing in traveling and the lift air springs for lifting and descending the axles are separately mounted, the structure of a vehicle is complicated and the number of parts increases, and therefore the manufacturing cost and the weight are increased.

However, this system also has a problem that the manufacturing cost and the weight are increased, because ride air springs and lift air springs are separately mounted.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an air spring for a vehicle which simultaneously performs the functions of shock-absorbing and vertical movement of a pusher system.

Various aspects of the present invention provide an air spring for a vehicle, which may include: a piston chamber with a bottom connected with an axle assembly to be able to move up/down; an air chamber with a top fixed to a car body and a bottom seated over a top of the piston chamber to be extendable and contractible by inflow/outflow of air; a piston positioned in the piston chamber, vertically dividing an internal space of the piston chamber into upper and lower internal spaces, and airtightly separating the upper internal space from the lower internal space; and an air control mechanism allowing air to flow into/out of the upper and lower internal spaces of the piston chamber and the internal space of the air chamber so that the piston chamber and the axle assembly are moved up/down with extension/contraction of the air chamber by the inflow/outflow of the air.

A lower plate may be airtightly coupled to the bottom of the piston chamber, a bottom of the lower plate may be supported by the axle assembly, an upper plate may be coupled to the top of the air chamber, and a top of the upper plate may be coupled to the car body.

The piston may be disposed with an upper end connected to the upper plate, a middle portion passing through the top of the piston chamber, and a lower substantially circular end in contact with an inner substantially circular side of the piston chamber.

A bracket may be disposed between the piston and the upper plate, and a bottom of the bracket and the upper end of the piston may be coupled in a form of a ball joint such that the piston rotates when the axle assembly shakes.

The air control mechanism may include a first air valve provided to allow air to flow into/out of the internal space of the air chamber, and a second air valve provided to allow air to flow into/out of the upper internal space of the piston chamber, and an air hole that communicates with the piston chamber and is formed at a position corresponding to the lower internal space of the piston chamber.

The first air valve may be disposed through an upper air plate coupled to the top of the air chamber.

The second air valve may include a first valve part disposed through an upper air plate coupled to the top of the air chamber, a second valve part disposed through the top of the piston chamber, and a bridge connecting the first valve part and the second valve part and through which the air flows.

The bridge may be formed in an extendable/contractible shape, and extend or contract in accord with a vertical movement of the piston chamber.

Accordingly, since the operations of lifting and shock-absorbing of a pusher system can be simultaneously achieved by appropriately controlling air in the air chamber and the piston chamber, the functions of an air spring for riding and an air spring for lifting are integrated. Therefore, it is possible to remove the problem that the increase in manufacturing cost and weight due to separate mounting of air springs.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to exemplary embodiments thereof illustrating the accompanying drawings which are given hereinbelow by way of illustration only, and thus are not limitative of the present invention, and wherein.

Figure 1:
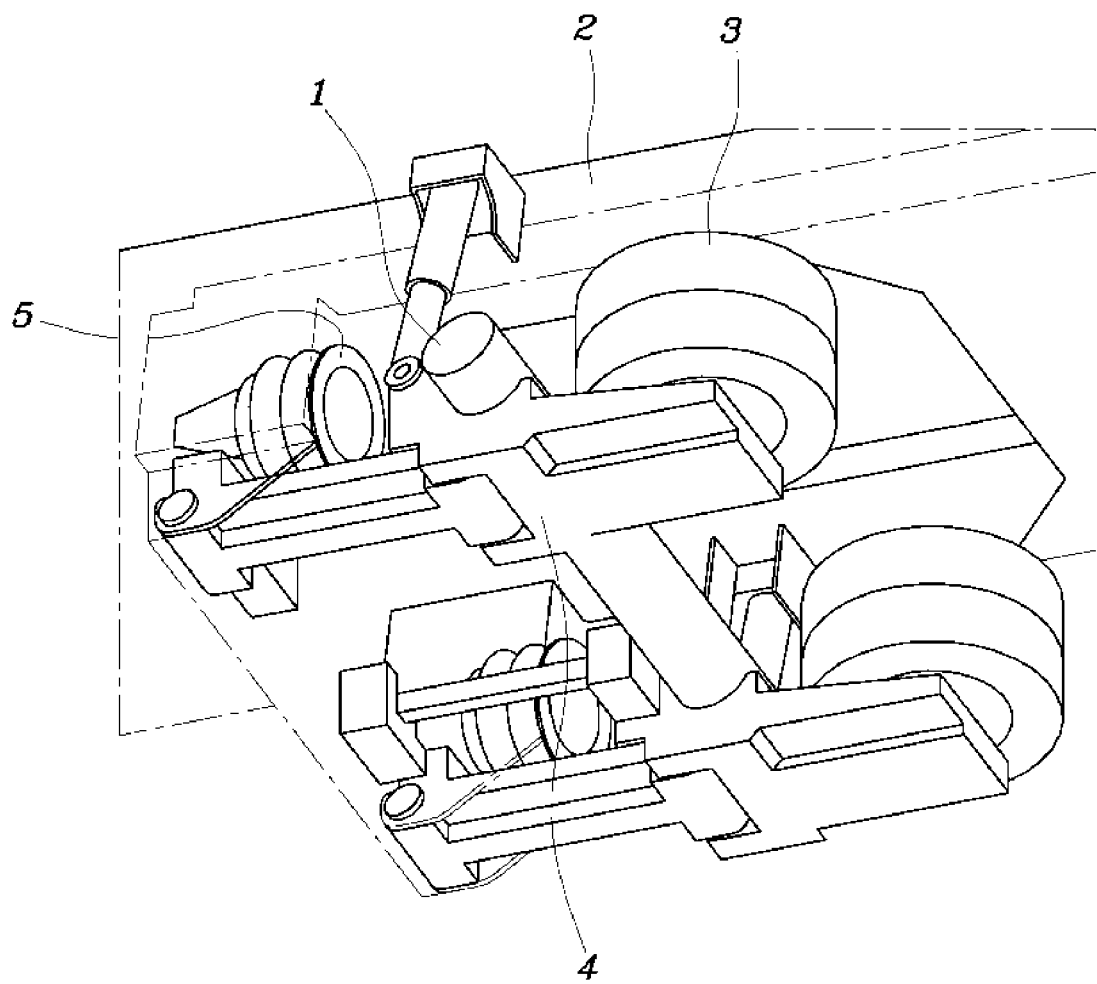
FIG. 1 is a view illustrating the configuration with two air springs separately mounted in a pusher system according to the related art.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
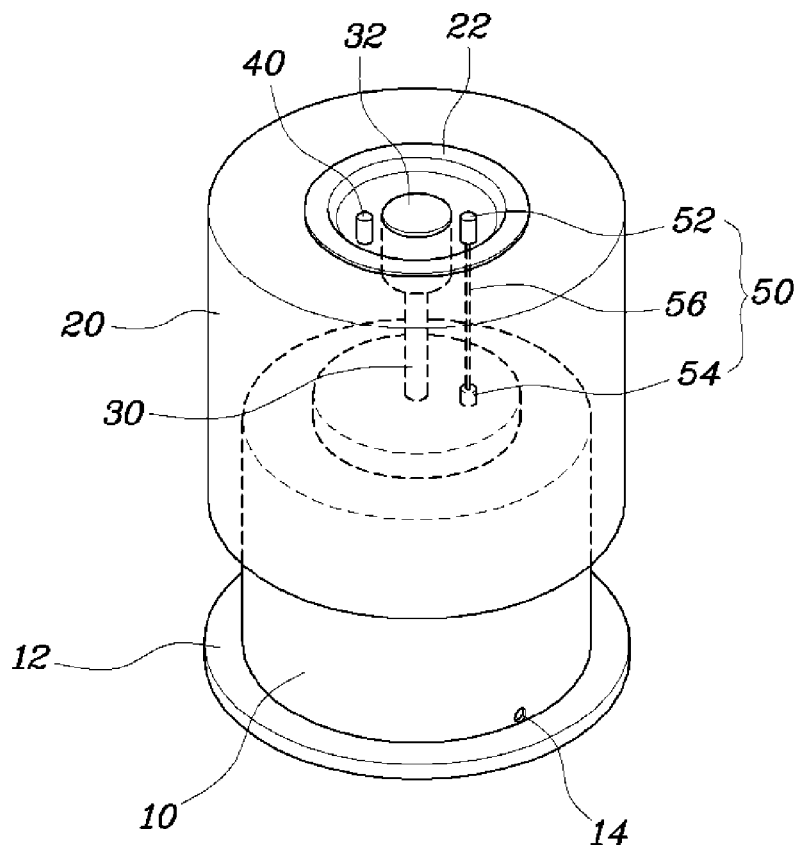
FIG. 2 is a view illustrating a configuration of an exemplary air spring for a vehicle according to the present invention.
Figure 3:
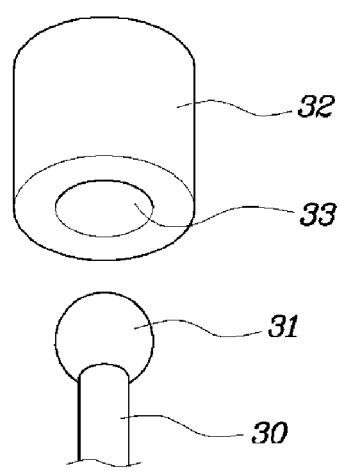
FIG. 3 is a view illustrating the combination relationship between an exemplary piston and an exemplary bracket according to the present invention.
Figure 4:
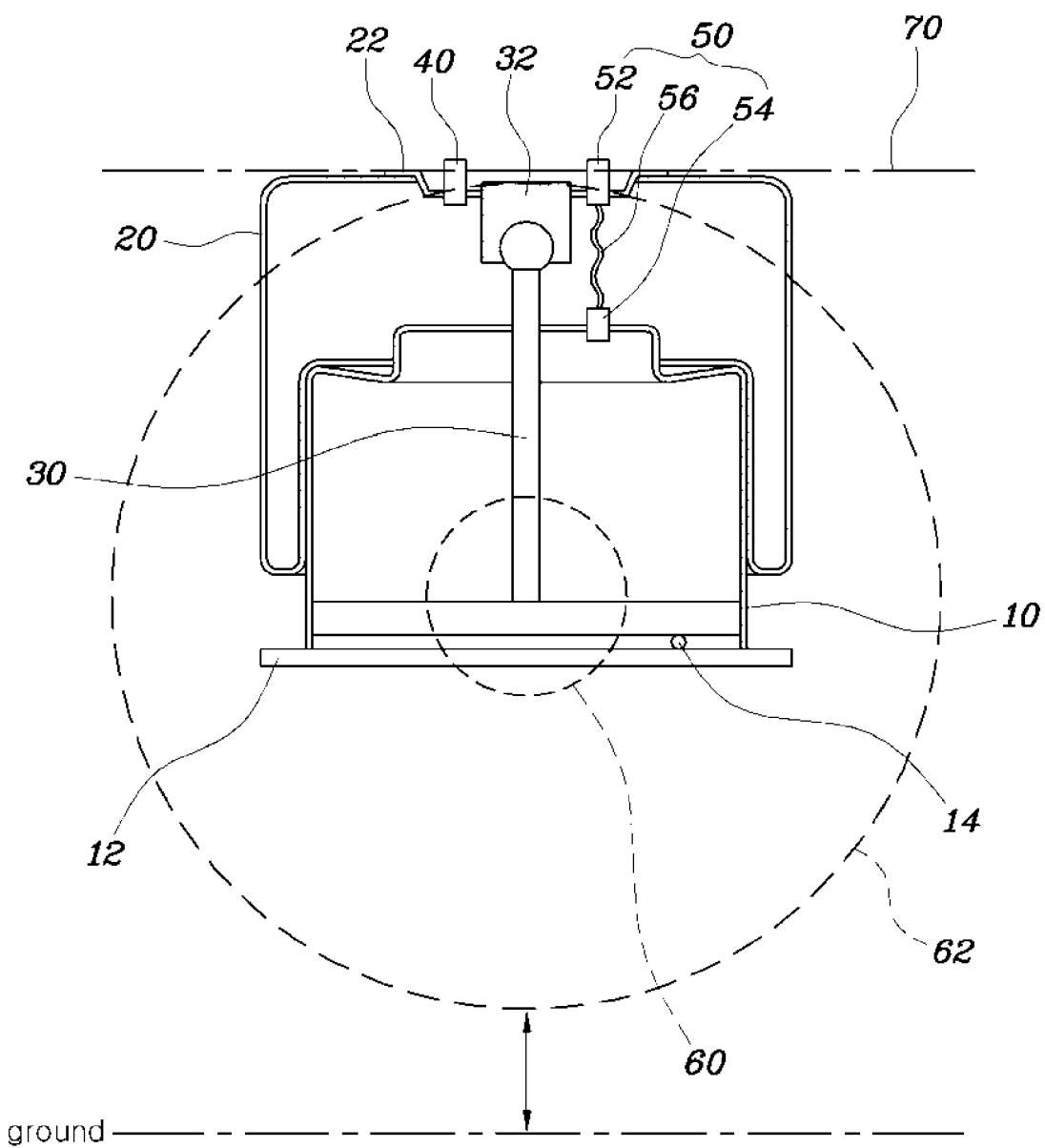
FIGS. 4 and 5 are views illustrating the operation of an exemplary air spring for a vehicle according to the present invention which simultaneously performs shock-absorbing and lifting/descending.
Figure 5:
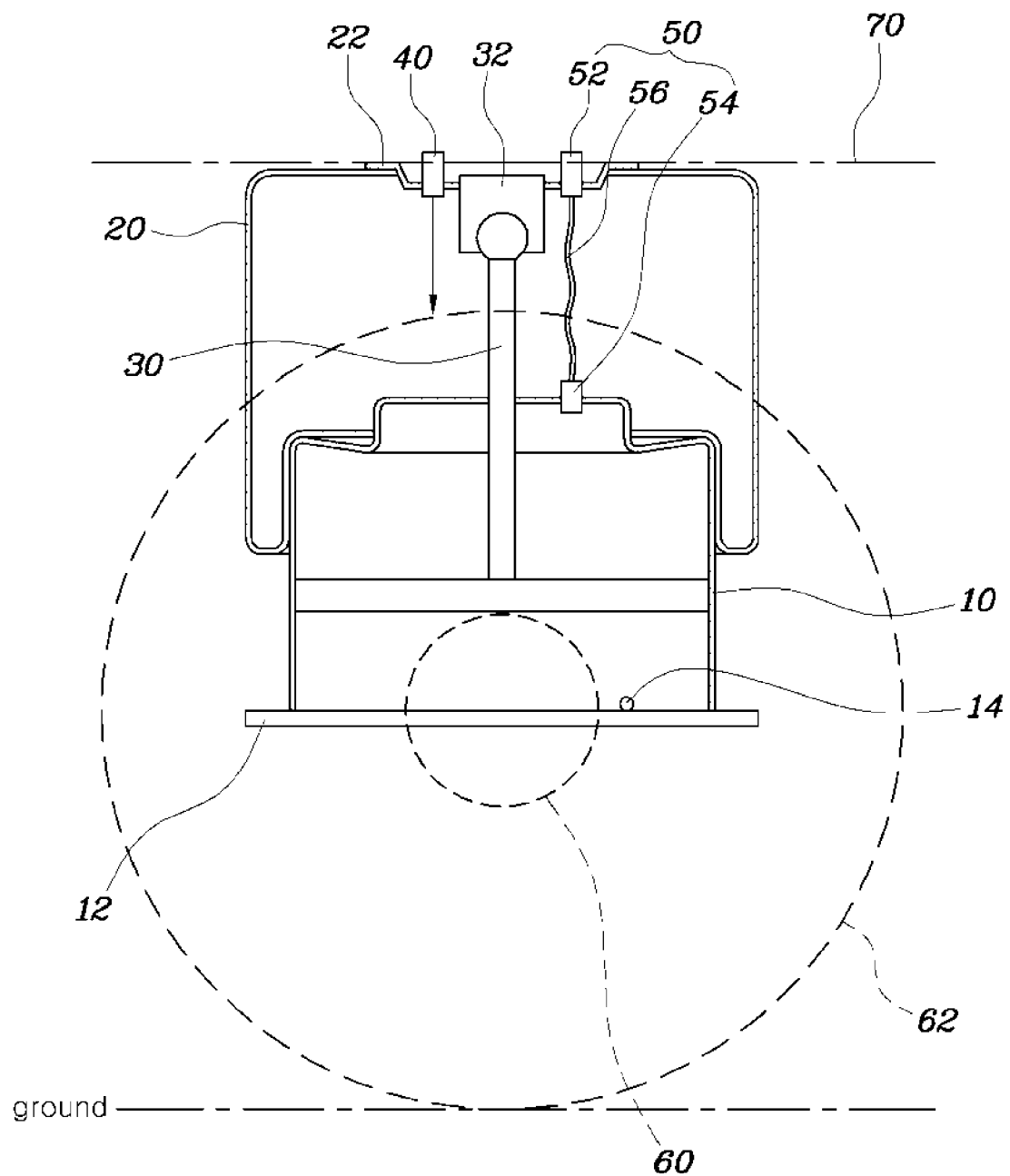

FIG. 2 is a view illustrating a configuration of an air spring for a vehicle according to the present invention, FIG. 3 is a view illustrating the combination relationship between a piston and a bracket according to the present invention, and FIGS. 4 and 5 are views illustrating the operation of an air spring for a vehicle according to the present invention which simultaneously performs shock-absorbing and lifting/descending.

An air spring for a vehicle of the present invention includes a piston chamber 10, an air chamber 20, a piston 30, and an air control mechanism.

According to various embodiments of the present invention, with reference to FIGS. 2 to 5, the air spring includes: the piston chamber 10 with the bottom connected with an axle assembly 60 to be able to move up/down; the air chamber 20 with the top fixed to a car body 70 and the bottom seated over the top of the piston chamber 10 to be extendable and contractible by inflow/outflow of air; the piston 30 positioned in the piston chamber 10, vertically dividing the internal space of the piston chamber 10, and sealing or airtightly separating the divided spaces; and the air control mechanism allowing air to flow into/out of the upper and lower internal spaces of the piston chamber 10 and the internal space of the air chamber 20 so that the piston chamber 10 and the axle assembly 60 are moved up or down with extension or contraction of the air chamber 20 by the inflow/outflow of the air.

That is, referring to FIG. 4, as for a vehicle without a load, as the air chamber 20 is contracted by removing air from the air chamber 20 up to the minimum level and air is injected into the upper internal space of the piston chamber 10, the piston chamber 10 moves up. Accordingly, the pusher system is operated such that the axle assembly 60 combined with the piston chamber 10 correspondingly moves up and the wheels 62 at both sides of the axle assembly 60 are spaced from the ground.

In contrast, referring to FIG. 5, as for a vehicle with loads, as the air chamber 20 is extended by injecting air into the air chamber 20, the piston chamber 10 moves down. Accordingly, a pusher system is operated such that the axle assembly 60 combined with the piston chamber 10 correspondingly moves down and the wheels 62 at both sides of the axle assembly 60 are brought in contact with the ground.

The air chamber 20 extends with a large amount of air injected and the upper internal space of the piston chamber 10 is filled with air in the sealed state, so the shock-absorbing operation of a pusher system is achieved by the air chamber 20 and the piston chamber 10.

Accordingly, since the operations of lifting and shock-absorbing of a pusher system can be simultaneously achieved by appropriately controlling air in the air chamber 20 and the piston chamber 10, the functions of an air spring for riding and an air spring for lifting are integrated. Therefore, the problem that the increase in manufacturing cost and weight due to separate mounting of air springs is eliminated or reduced.

Referring to FIGS. 4 and 5, in the present invention, a lower plate 12 is airtightly coupled to the bottom of the piston chamber 10, the bottom of the lower plate 12 is supported on the axle assembly 60, an upper plate 22 is coupled to the top of the air chamber 20, and the top of the upper plate 22 is coupled to the car body 70.

That is, the wheels 62 are coupled to both sides of the axle assembly 60, the lower plate 12 is coupled to and supported by the top of the axle assembly 60, the piston chamber 10 is coupled to the top of the lower plate 12, the air chamber 20 is disposed over the top of the piston chamber 10, the upper plate 22 is coupled to the top of the air chamber 20, and the top of the upper plate 22 is coupled to the car body 70.

The axle assembly 60 may have a structure with an axle supported on the top of a clamp beam, and accordingly or alternatively, the lower plate may be supported by the axle assembly 60 through the clamp beam or may be supported directly on the top of the axle.

Therefore, with the extension and contraction of the air chamber 20 and the vertical movement of the piston chamber 10, the wheel 62 on the axle assembly 60 can be moved up and down with respect to the car body 70.

Further, in the present invention, the piston 30 may be disposed with the upper end connected to the upper plate 22, the middle portion through the top of the piston chamber 10, and the lower circular or substantially circular end in close contact with the inner circular or substantially circular side of the piston chamber 10.

That is, since the upper end of the piston 30 is connected to the upper plate 22, the piston 30 is limited in left/right movement, and the lower circular end of the piston 30 is guided by the inner circular side of the piston chamber 10, so the piston chamber 10 can be vertically moved.

The top of the piston chamber 10 through which the piston 30 passes needs to be airtightly designed.

A bracket 32 is disposed between the piston 30 and the upper plate 22 and the bottom of the bracket 32 and the upper end of the piston 30 are coupled as a style of a ball joint, so that the piston 30 can rotate, when the axle assembly 60 shakes.

That is, a ball groove 33 is formed at the center of the bottom of the bracket 32 and a ball 31 corresponding to the ball groove 33 is formed at the upper end of the piston 30, so that the piston 30 can more freely rotate and vertical shaking and vibration of the piston chamber 10 are reduced.

On the other hand, the air control mechanism may include a first air valve 40 provided to allow air to flow into/out of the internal space of the air chamber 20 and a second air valve 50 provided to allow air to flow into/out of the upper internal space of the piston chamber 10, in which an air hole 14 that communicates with the piston chamber 10 may be formed at a position corresponding to the lower internal space of the piston chamber 10.

That is, the air in the air chamber 20 can flow in/out through the first air valve 40 and the air in the upper internal space of the piston chamber 10 can flow in/out through the second air valve 50.

As air is injected into the upper internal space of the piston chamber 10, the air in the lower internal space of the piston chamber 10 comes out of the piston chamber 10 through the air hole 14, so the piston chamber 10 can move up.

On the contrary, as the piston chamber 10 moves down, the air outside the piston chamber 10 naturally flows into the lower internal space of the piston chamber 10 through the air hole 14, so the piston chamber 10 can move down.

The first air valve 40 may be disposed through the upper air plate 22 coupled to the top of the air chamber 20.

That is, it is possible to inject air into the air chamber 20 or take out the air in the air chamber 20 through the first air valve 40.

Further, the second air valve 50 may include a first valve part 52 disposed through the upper air plate 22 coupled to the top of the air chamber 20, a second valve part 54 disposed through the top of the piston chamber 10, and a bridge 56 that is connected between the first valve part 52 and the second valve part 54 and through which air flows.

That is, when air is injected through the second air valve 50, air is injected into the upper internal space of the piston chamber 10 through the first valve part 52, the bridge 56, and the second valve part 54.

The bridge 56 is formed in an extendable shape, so it can extend and contract with the vertical movement of the piston chamber 10.

That is, as the air chamber 20 extends or contracts, the bridge 56 elastically extends or contracts, thereby preventing damage to the second air valve 50. The bridge 56 may be formed in the shape of a spiral or corrugated pipe.

For convenience in explanation and accurate definition in the appended claims, the terms "upper" or "lower", "front" or "rear", "top" or "bottom", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air spring for a vehicle, comprising:
   a piston chamber with a bottom connected with an axle assembly to be able to move up/down;
   an air chamber with a top fixed to a car body and a bottom seated over a top of the piston chamber to be extendable and contractible by inflow/outflow of air;
   a piston positioned in the piston chamber, vertically dividing an internal space of the piston chamber into upper and lower internal spaces, and airtightly separating the upper internal space from the lower internal space; and
   an air control mechanism allowing the air to flow into/out of the upper and lower internal spaces of the piston chamber and an internal space of the air chamber so that the piston chamber and the axle assembly are moved up/down with extension/contraction of the air chamber by the inflow/outflow of the air,
   wherein the air control mechanism includes:
      a first air valve provided to allow the air to flow into/out of the internal space of the air chamber;
      a second air valve provided to allow the air to flow into/out of the upper internal space of the piston chamber; and
      an air hole that communicates with the piston chamber and is formed at a position corresponding to the lower internal space of the piston chamber, and
   wherein the second air valve includes:
      a first valve part disposed through an upper air plate coupled to the top of the air chamber;
      a second valve part disposed through the top of the piston chamber; and
      a bridge connecting the first valve part and the second valve part and through which the air flows.

2. The air spring of claim 1, wherein the first air valve is disposed through an upper air plate coupled to the top of the air chamber.

3. The air spring of claim 1, wherein the bridge is formed in an extendable/contractible shape, and extends or contracts in accord with a vertical movement of the piston chamber.

4. The air spring of claim 1, wherein a lower plate is airtightly coupled to the bottom of the piston chamber, a bottom of the lower plate is supported by the axle assembly, an upper plate is coupled to the top of the air chamber, and a top of the upper plate is coupled to the car body.

5. The air spring of claim 4, wherein the piston is disposed with an upper end connected to the upper plate, a middle portion passing through the top of the piston chamber, and a lower substantially circular end in contact with an inner substantially circular side of the piston chamber.

6. The air spring of claim 5, wherein a bracket is disposed between the piston and the upper plate, and
   a bottom of the bracket and the upper end of the piston are coupled in a form of a ball joint such that the piston rotates when the axle assembly shakes.

* * * * *